United States Patent
Ten Kate

(10) Patent No.: US 9,587,941 B2
(45) Date of Patent: Mar. 7, 2017

(54) METHOD OF ENHANCING THE DETECTABILITY OF A HEIGHT CHANGE WITH AN AIR PRESSURE SENSOR AND A SENSOR UNIT FOR DETERMINING A HEIGHT CHANGE

(75) Inventor: Warner Rudolph Theophile Ten Kate, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 172 days.

(21) Appl. No.: 14/232,654

(22) PCT Filed: Jun. 28, 2012

(86) PCT No.: PCT/IB2012/053290
§ 371 (c)(1),
(2), (4) Date: Jan. 14, 2014

(87) PCT Pub. No.: WO2013/011398
PCT Pub. Date: Jan. 24, 2013

(65) Prior Publication Data
US 2014/0150530 A1    Jun. 5, 2014

Related U.S. Application Data

(60) Provisional application No. 61/509,653, filed on Jul. 20, 2011.

(30) Foreign Application Priority Data

Jul. 20, 2011    (EP) ..................................... 11174670

(51) Int. Cl.
G01C 5/06    (2006.01)
G08B 21/04    (2006.01)

(52) U.S. Cl.
CPC ............. *G01C 5/06* (2013.01); *G08B 21/043* (2013.01); *G08B 21/0446* (2013.01)

(58) Field of Classification Search
CPC ............................. G01C 5/06; G08B 21/0446
See application file for complete search history.

(56) References Cited

U.S. PATENT DOCUMENTS 7,423,537 B2    9/2008    Bonnet et al.
7,893,844 B2    2/2011    Gottlieb
(Continued)

FOREIGN PATENT DOCUMENTS

EP    1642248    2/2007
EP    1895271    8/2007
(Continued)

OTHER PUBLICATIONS

Thinh M. Le et al., "Accelerometer-Based Sensor Network for Fall Detection", IEEE, 2009, pp. 265-268.

*Primary Examiner* — Laura Martin
*Assistant Examiner* — Alex Devito

(57) ABSTRACT

A sensor unit (2) comprising a pressure sensor (9) is worn by a person. A fall of the person causes a height change as well an orientation change of the pressure sensor. To enlarge the detectability of the fall the air pressure is positioned such that in a pre-fall condition the contribution of an error to the sensor's measurement is maximal. This error is caused by gravity acting on the membrane of the sensor.

20 Claims, 8 Drawing Sheets

(56) References Cited

U.S. PATENT DOCUMENTS

| | | | |
|---|---|---|---|
| 2002/0045921 A1* | 4/2002 | Wolinsky | A61B 5/0028 607/61 |
| 2005/0000293 A1 | 1/2005 | Kandler | |
| 2006/0139166 A1* | 6/2006 | Choutier | G08B 21/0446 340/539.12 |
| 2009/0322540 A1 | 12/2009 | Richardson et al. | |

FOREIGN PATENT DOCUMENTS

| | | |
|---|---|---|
| JP | S06320095 | 2/1988 |
| WO | 2008129451 A1 | 10/2008 |
| WO | WO2009101566 | 8/2009 |
| WO | 2009138941 A | 11/2009 |
| WO | WO2010026513 | 3/2010 |
| WO | 2010044032 A1 | 4/2010 |
| WO | 2010105045 A2 | 9/2010 |
| WO | 2010134010 A1 | 11/2010 |
| WO | WO2010126878 | 11/2010 |
| WO | 2010150260 A1 | 12/2010 |
| WO | 2011010191 A1 | 1/2011 |
| WO | WO2011004322 | 1/2011 |

\* cited by examiner

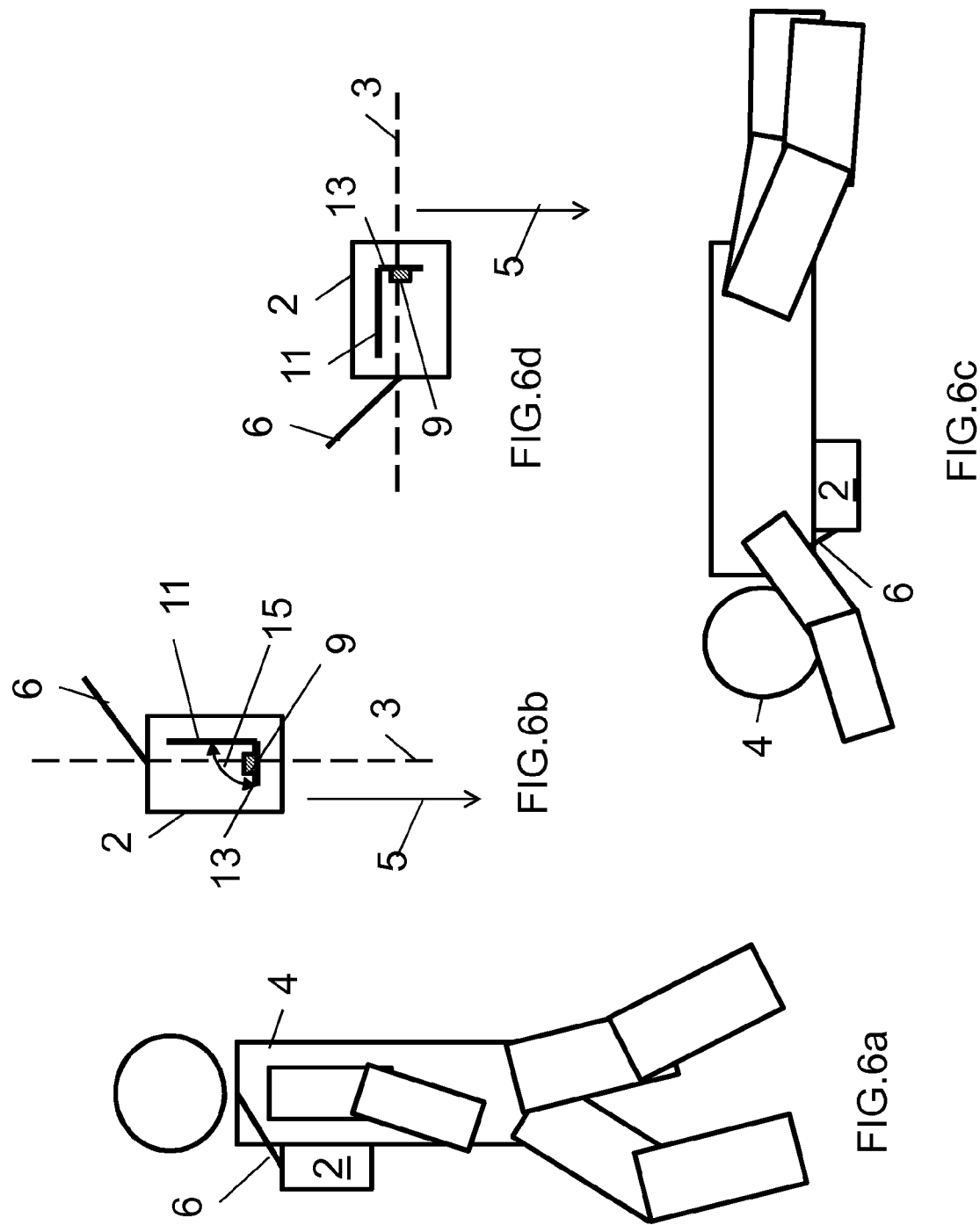

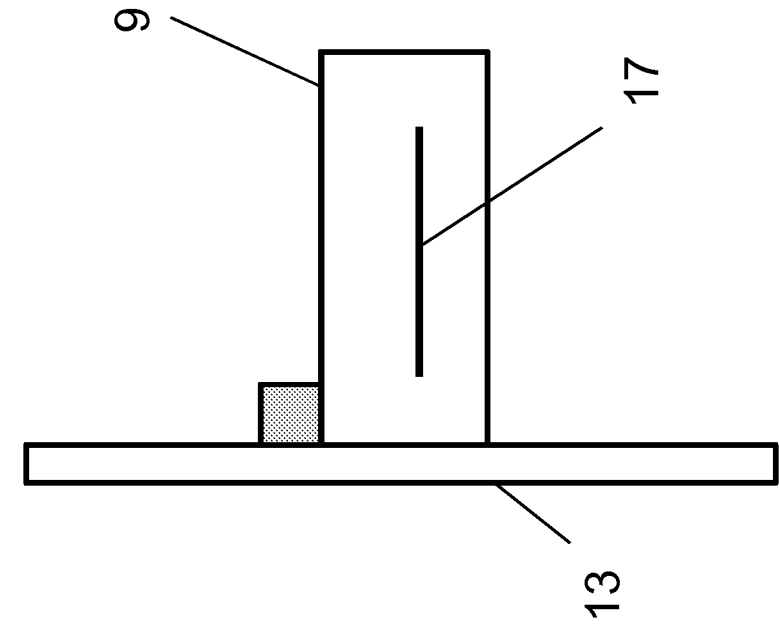
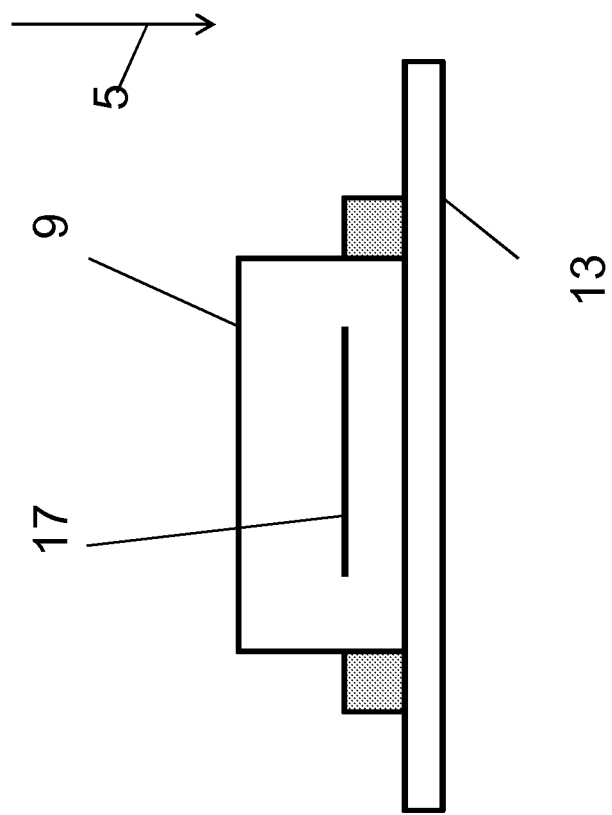
FIG. 8b
FIG. 8a

METHOD OF ENHANCING THE DETECTABILITY OF A HEIGHT CHANGE WITH AN AIR PRESSURE SENSOR AND A SENSOR UNIT FOR DETERMINING A HEIGHT CHANGE

CROSS-REFERENCE TO PRIOR APPLICATIONS

This application is the U.S. National Phase application under 35 U.S.C. §371 of International Application Serial No. PCT/IB2012/053757, filed on Jun. 28, 2012, which claims the benefit of U.S. Provisional Application Ser. No. 61/509,653, filed on Jul. 20, 2011, and European Application Serial No. 11174670.7, filed Jul. 20, 2011. These applications are hereby incorporated by reference herein.

FIELD OF THE INVENTION

The invention relates to a method of enhancing the detectability of a height change with an air pressure sensor. The invention further relates to a sensor unit for determining a height change.

BACKGROUND OF THE INVENTION

Pressure sensors have been developed that can resolve pressure differences in the surrounding environment of around 1.5 Pascal (Pa). These sensors have a sensitivity enabling applications for determining differences in altitude of less than 1 meter from measurements of the air pressure. This makes them fit for detecting motion of a person wearing such a pressure sensor. In EP1642248 a pressure sensor is attached to a person and used to determine height change. The determined height change is indicative of the fall of the person.

WO2009/101566 discloses that the altitude measurement provided by such a pressure sensor has a possible error of about 0.5 meter, whereby this error depends on the orientation of said pressure sensor.

For a fall detector it is preferable that also small height changes are detectable. For example when a person falls out of his chair the possible error in the measurement of a pressure sensor may be in the order of the height change that is to be detected.

SUMMARY OF THE INVENTION

It is an object of the present invention to enhance the detectability of a height change with an air pressure sensor.

The inventor of the present application has identified that instead of compensating for the error in the measurement of the pressure sensor in some applications the error can be used to enhance the detectability of a height change. For very sensitive pressure measurements such as those required for implementing fall detectors this enhanced detectability enables the detection of small height changes (such as for example with the fall out of a chair) thereby providing improved reliability that a fall of the person is correctly detected.

The invention is based on the insight that in many cases the orientation of a person before the fall differs from the orientation of the person after the fall. Thus also the orientation of a pressure sensor attached to said person changes as a result of the fall.

According to a first aspect of the present invention there is provided a method of enhancing the detectability of a height change with an air pressure sensor according to claim 1.

When the person has the predetermined posture the pressure sensor has its preferred orientation relative to the direction of gravity to provide the largest height measurement (or lowest pressure measurement) while the sensor unit has the reference orientation relative to the direction of gravity. The relative orientation is the orientation of the pressure sensor relative to the orientation of the sensor unit wherein the pressure sensor has the preferred orientation while the sensor unit has the reference orientation. The relative orientation obtained with the claimed method can for example be used when mounting or adjusting the orientation of the pressure sensor in the housing of the sensor unit that encloses the pressure sensor.

The orientation of the pressure sensor relative to the direction of gravity can cause a measurement error and in the invention this measurement error is used to increase the height measurement value when the person is in a predetermined posture. The predetermined posture may for example correspond to a person standing upright or to the posture of a walking or sitting person. When the person has the predetermined posture (e.g. is standing upright) the orientation of the sensor unit that is attached to the person has the reference orientation with respect to the direction of gravity. The orientation of the pressure sensor in the sensor unit is chosen such that when the person wearing the sensor unit has the predetermined posture the contribution of the error to the measurement result is largest. This orientation of the pressure sensor is referred to as the preferred orientation. If the pressure sensor provides a pressure measurement the pressure sensor will provide in the preferred orientation a lowest pressure measurement. A lowest pressure measurement corresponds to a largest height measurement. When the person falls or tumbles his posture changes causing a change in the orientation of the pressure sensor. The orientation change of the pressure sensor reduces the error contribution to the measurement result. This reduced contribution of the error 'adds' to the change in measurement value that results from the height change of the person when he tumbles or falls. Hence the measurement value of a determined pressure or height change is increased thereby enhancing the detectability of a pressure or height change.

In the method of enhancing the detectability of a height change with an air pressure sensor the method of determining of the preferred orientation of the pressure sensor may comprise the following steps:

a first step of rotating the pressure sensor in the absence of any forces other than gravity into a plurality of orientations;

a second step of obtaining the height (or pressure) measurement of the pressure sensor as a function of the orientation of the pressure sensor relative to the direction of gravity;

a third step of determining the orientation relative to the direction of gravity that results in the largest height measurement (or lowest pressure measurement), the preferred orientation of the pressure sensor corresponding to said determined orientation.

According to a second aspect of the invention there is provided a sensor unit for determining a height change, the sensor unit being attachable to the person and comprising a pressure sensor. The orientation of the pressure sensor in the sensor unit is determined according to the method of enhancing the detectability of a height change with an air pressure sensor.

In an embodiment the sensor unit is shaped as a pendant. The reference orientation corresponds to the orientation of the pendant relative to the direction of gravity when the pendant hangs around the neck of an upright standing person.

In an embodiment of the sensor unit the pressure sensor comprises a bendable or moveable membrane for detecting changes in air pressure. The membrane can be formed so that it acts as one plate of a capacitor, for example, so movements of the membrane in response to changes in pressure result in a change in capacitance of the pressure sensor. However as the pressure sensor is so sensitive, the membrane can be influenced by a change in orientation normal to the direction in which the gravity acts. The membrane preferably is positioned in a plane. The preferred orientation of the pressure sensor in the sensor unit corresponds to the orientation of the pressure sensor in which the direction of the gravity force is normal to said plane. In the preferred orientation the movement or bending of the membrane in response to the gravity causes the largest height measurement (or lowest pressure measurement). Therefore in the sensor unit according to the invention the orientation of the pressure sensor in the sensor unit is such that the direction of gravity is perpendicular to the plane when the person has the predetermined posture and the sensor unit has the reference orientation.

In a further embodiment of the pendant shaped sensor unit the orientation of the pressure sensor in the sensor unit is such that when the pendant is hanging around the neck of a person having a posture corresponding to a walking or standing person the direction of the gravity force is normal to the plane in which the membrane is positioned. In a further embodiment the pendant has an elongated shape having a longest axis, a neck cord being attached to one of the ends of the pendant. In the reference orientation the longest axis is in parallel with the direction of gravity. The membrane of the pressure sensor has a relative orientation relative to the sensor unit of about 90 degrees, that is the longest axis of the pendant is about perpendicular to the plane of the membrane.

In another embodiment the sensor unit is shaped as a wrist watch wherein the reference orientation corresponds to the orientation of the sensor unit relative to the direction of gravity when attached to the wrist of a vertical downwards hanging arm. The pressure sensor is positioned such that when the watch is in the reference orientation the pressure sensor provides a largest measurement error resulting in a lowest pressure measurement or a largest height measurement. In a further embodiment the sensor unit comprises a pressure sensor having a membrane, the pressure sensor being mounted in the watch such that when the watch has the reference orientation the membrane is normal to the direction of gravity such that the pressure sensor provides a lowest pressure or largest height measurement.

BRIEF DESCRIPTION OF THE DRAWINGS

The invention will now be described, by way of example only, with reference to the following drawings, in which:

FIG. 4 comprising

FIG. 6 comprising FIGS. 6*a*-6*d* shows a user wearing the sensor unit and the sensor unit before and after a fall;

FIG. 7 comprising

FIG. 8 comprising FIGS. 8*a* and 8*b* shows examples of a pressure sensor mounted on a printed circuit board.

DETAILED DESCRIPTION OF THE EMBODIMENTS

Figure 1:
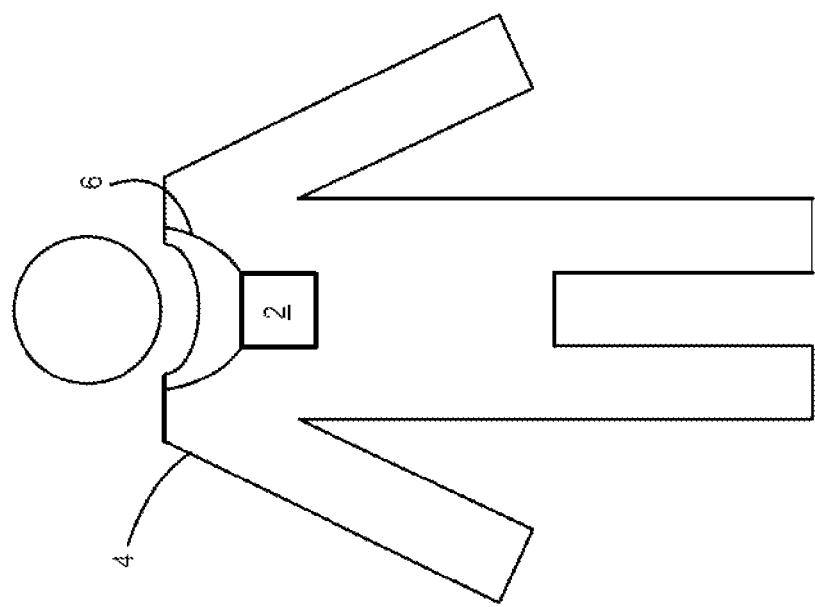
FIG. 1 shows a sensor unit shaped as a pendant that is to be worn by the user.

As shown in FIG. 1, the invention provides a sensor unit 2 that is to be worn by a user 4. In the illustrated embodiment, the sensor unit 2 is provided in the form of a pendant with a neck cord 6 for placement around the user's neck. Alternatively, the sensor unit 2 can be configured to be worn at or on a different part of the user's body, such as the wrist, trunk, waist, pelvis or sternum, and will comprise a suitable arrangement for attaching the sensor unit 2 to that part of the body (for example a belt or a strap if the unit 2 is attached to the pelvis or sternum).

The sensor unit 2 is used to measure the movement of the user 4 and to process the measurements to determine for example when the user 4 has suffered from a fall. Alternatively, this processing can be performed in a base unit that is separate to the sensor unit 2 worn by the user 4 (not shown in FIG. 1). In an embodiment the base unit is a stationary unit and for example positioned in the dwelling of the user. In a further embodiment the base unit is a portable unit that is carried by the user. In an embodiment the base unit is a mobile phone that is adapted for exchanging data with the sensor unit. In a further embodiment the mobile phone comprises the sensor unit.

Figure 2:
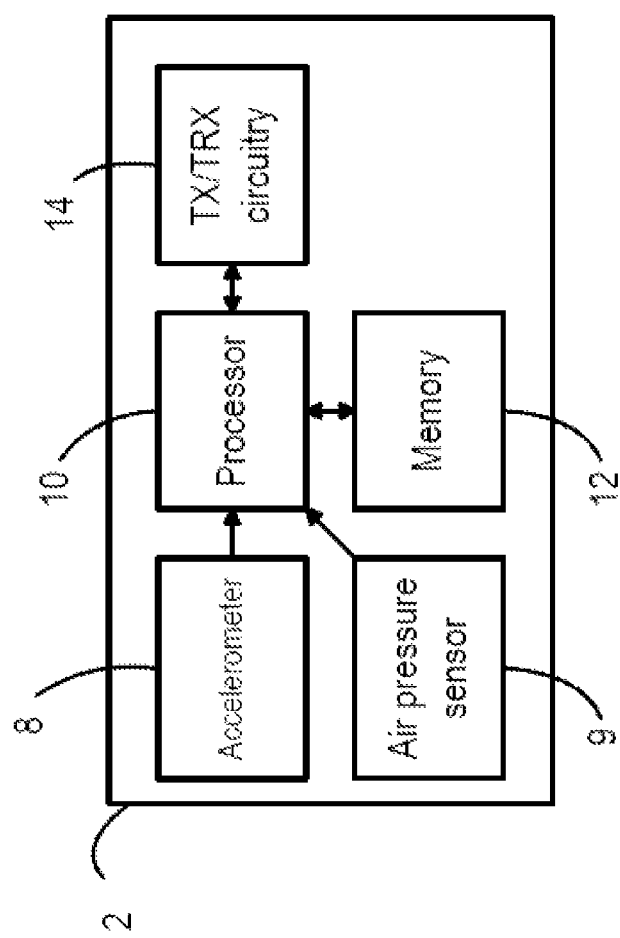
FIG. 2 shows a block diagram of a sensor unit in accordance with the invention.

FIG. 2 shows a preferred embodiment of the sensor unit 2 in accordance with the invention. The sensor unit 2 comprises an air pressure sensor 9 that measures air pressure. The air pressure may be converted into altitude or height of the sensor unit 2 given the air pressure at a reference altitude for example sea level. When used as a fall detector the sensor unit preferably further comprises at least one further sensor. The at least one further sensor preferably comprises an accelerometer 8 that measures acceleration along three orthogonal axes and may be used to increase the ability of recognizing movements relating to a fall from other movements relating to activities of daily living. The signals output by the accelerometer 8 and sensor 9 are provided to a processor 10 for analysis.

The sensor unit 2 also comprises a transmitter or transceiver circuitry 14 and preferably also a memory 12. The memory 12 is used for storing measurements from the accelerometer 8 and pressure sensor 9, and for storing the results of the analysis by the processor 10. The wireless transmitter or transceiver circuitry 14 is preferably used for transmitting the results of the analysis to a remote (base) unit or a computer where they can be viewed or studied by the user or a healthcare provider.

In an embodiment of the invention, the measurements collected by the accelerometer 8 and pressure sensor 9 are analyzed by the processor 10 in the sensor unit 2 to determine the occurrence of a fall. The wireless transmitter is used to transmit a fall alarm signal to a remote emergency service provider, and/or other care givers (for example a relative), in response to the determined occurrence of the fall. Alternatively, the measurements from the accelerometer 8 and sensor 9 could be transmitted to a base unit via the transmitter/transceiver circuitry 14, with the base unit analyzing the measurements to determine the occurrence of a fall and providing the fall alarm signal to a remote location. In either case, the processing can be performed in (near) real-time or the measurements from the accelerometer 8 and the pressure sensor 9 can be stored in the memory 12 or the base unit for future processing (i.e. offline) in case there is no hazardous situation detected.

The air pressure sensor 9 is sensitive to ambient pressure around the sensor unit 2. Preferably, the pressure sensor 9 can detect pressure changes of the order of 1 Pascal, although the invention is applicable to pressure sensors with a maximum pressure change resolution that is significantly higher or lower than 1 Pascal.

The air pressure sensor preferably comprises an integrated circuit (IC) enclosed by a package, for example an SMD package. The sensor IC comprises a pressure transducer for detecting air pressure. The pressure transducer may for example be a piezo-resistive transducer, or a capacitive transducer, or a pressure transducer that is making use of another physical principle.

To be able to measure air pressure the pressure transducers is susceptible to a force acting on it. The part of the pressure transducer that is moveable or bendable in response to the force acting on it is referred to as the membrane. Movement of the membrane causes a change in an electrical quantity such as charge, voltage, resistance, etc. The force is caused by the air pressure of the air surrounding the pressure transducer. Also gravity is acting on the pressure transducer causing it to be sensitive to gravity as well. The sensitivity to gravity is dependent on the orientation of the pressure transducer relative to the direction of gravity resulting in an orientation dependent air pressure measurement error. The preferred orientation is the orientation in which the pressure sensor at a given height provides a largest measurement error resulting in a largest height measurement or a lowest pressure measurement.

The sensor IC may further comprise analog and digital signal processing circuits to provide amplification, filtering, temperature compensation and linearization of an output signal provided by the pressure transducer to obtain a sensor IC pressure output signal. The sensor IC may be arranged to convert a measured pressure to a measured (relative) height. Dependent on the sensor IC the air pressure sensor may provide a pressure measurement or a height measurement.

Preferably, the pressure transducer in the sensor 9 comprises a membrane for detecting changes in air pressure P. In particular, the membrane can be formed so that it acts as one plate of a capacitor, so movements of the membrane in response to external forces caused by changes in air pressure result in a change in capacitance of the pressure sensor 9. However, as the pressure sensor is so sensitive, the membrane can be influenced by a change in the direction in which gravity acts (i.e. if the orientation of the pressure sensor 9 has changed) or by other accelerations acting on the pressure sensor 9.

A commonly used formula to convert pressure P to height H is given by $$H - H_0 = 44330\left(1 - \left(\frac{P}{P_0}\right)^{0.19}\right)$$

In this equation the $P_0$ is the pressure at reference level $H_0$ at a reference temperature, typically 288K. Typically sea level is used as reference: $H_0=0$ m, $P_0=1013.25$ hPa. Pressure P measured by the pressure transducer is further dependent on the orientation $\phi$ of the membrane relative to the direction of gravity. When the normal to the membrane is in parallel with the direction of gravity the measured pressure at a predetermined altitude is maximal or minimal, depending whether the membrane is upward or downward. In the preferred orientation, the one is selected at which the resulting height measurement is largest (or pressure measurement is lowest). The orientation for which the largest height measurement (or lowest pressure measurement) is obtained is referred to as the preferred orientation of the pressure sensor. In the preferred orientation the angle $\phi$ between the normal to the membrane and the direction of gravity is about 0 degrees.

In an embodiment the pressure sensor provides a pressure measurement. In a further embodiment the pressure sensor is arranged for converting a measured air pressure to a (relative) height (for example by using above mentioned formula) and provides a height measurement. In the method and sensor unit according to the invention both embodiments of the pressure sensor may be used and for ease of discussion a pressure sensor providing a height measurement is assumed. The equation shows that a decrease in pressure P results in an increase of height H. In the preferred orientation a lowest pressure measurement or a largest height measurement is determined. Therefore in the description and claims a "largest height measurement" corresponds to a "lowest pressure measurement".

Figure 3:
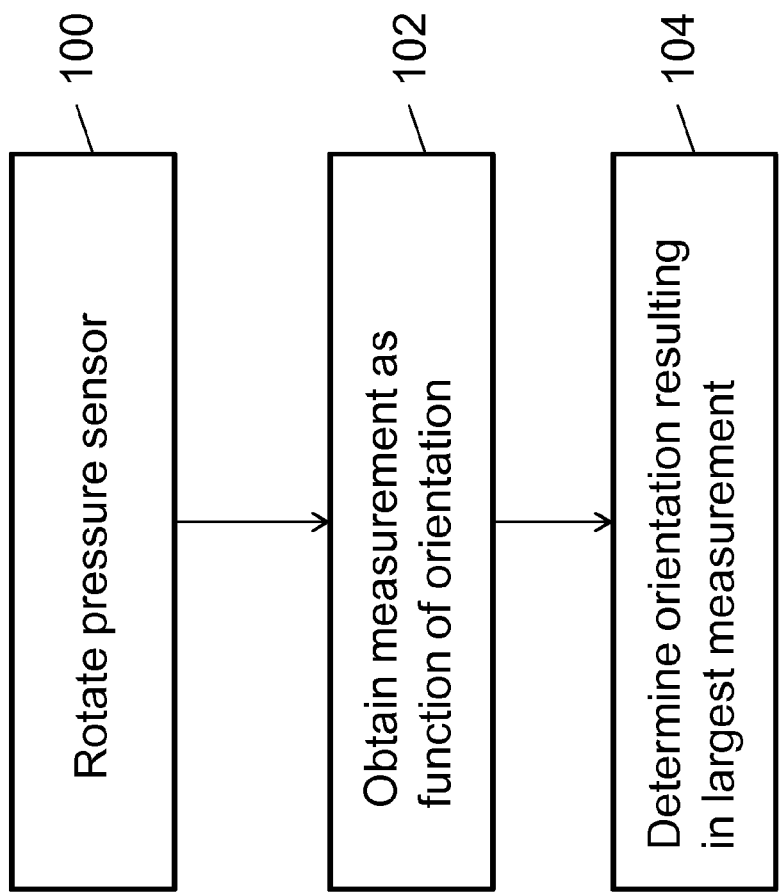
FIG. 3 shows a flow chart illustrating a method of determining the preferred orientation or a pressure sensor in accordance with the invention.

FIG. 3 shows a flow chart illustrating a method of determining the preferred orientation of the pressure sensor. The preferred orientation is determined in the absence of any other forces than gravity acting on the pressure sensor 9 (i.e. a static situation). In the method the most sensitive direction of the pressure sensor 9 is determined by rotating it in several rotational directions so as to improve the likelihood of obtaining an orientation of the pressure sensor in which its most sensitive direction is substantially aligned with the direction in which gravity is acting and the pressure sensor provides the largest height measurement (or lowest pressure measurement). When using a pressure sensor with a membrane the most sensitive direction of the pressure sensor is normal to the membrane. In the preferred orientation, the normal to the membrane is substantially in parallel with the direction of gravity. The orientation relative to the direction of gravity at which this largest height measurement is obtained is referred to as the preferred orientation. In the preferred orientation the angle between the normal to the membrane and the direction of gravity is about 0 degrees.

The method of determining the preferred orientation of the pressure sensor comprises:

a first step 100 of rotating the pressure sensor 9 in the absence of any forces other than gravity 5 into a plurality of orientations;

a second step 102 of obtaining the height measurement of the pressure sensor as a function of the orientation (relative to the direction of gravity) of the pressure sensor;

a third step 104 of determining the orientation that results in the largest height measurement, the preferred orientation corresponding to said determined orientation.

Figure 4B:
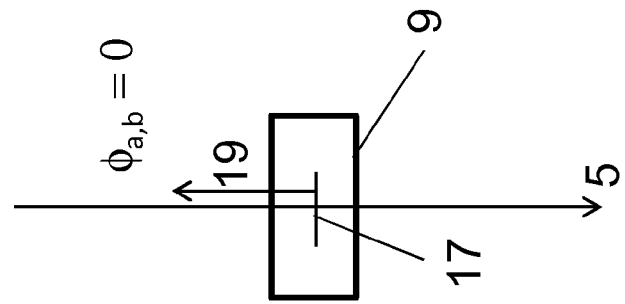
FIGS. 4*a* and 4*b* shows an orientation of a pressure sensor comprising a membrane relative to the direction of gravity.
Figure 4A:
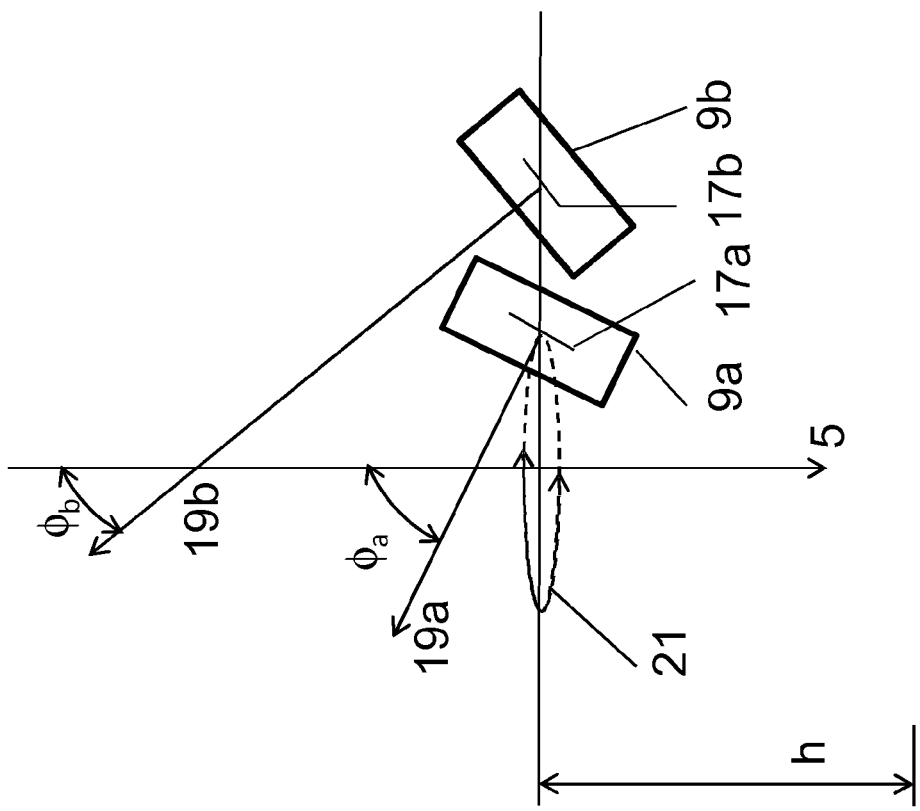

FIG. 4a and FIG. 4b show a pressure sensor 9, 9a, 9b comprising a pressure transducer having a membrane 17, 17a, 17b. The membrane is most sensitive to gravity when it is oriented such that the normal 19, 19a, 19b to the membrane is aligned with the direction of gravity 5. In FIGS. 4a and 4b the orientation $\phi$, $\phi_a$, $\phi_b$ of the pressure sensor is defined as the angle between the normal 19 and the direction of gravity 5. When the pressure sensor 9a, 9b is rotated while it is kept at height h above a reference height (sea level) a change of the angle between the normal 19a, 19b and the direction of gravity 5 from $\phi_a$ to $\phi_b$ is obtained and the height measurement provided by the pressure sensor increases (or pressure measurement decreases). For an orientation change from 0 and 90 degrees the height measurement decreases while keeping the pressure sensor at height h. In case the orientation is further changed between 90 and 180 degrees, the error contribution increases again but with opposite sign and hence will further reduce the height measurement value. As further shown in FIG. 4a the pressure sensor 19a and 19b may also be rotated (see circle 21) around an imaginary line 5 in parallel with the direction of gravity without changing the orientation $\phi_a$, $\phi_b$ of the normal relative to the direction of gravity 5. FIG. 4b shows that in the preferred orientation the normal 19 is in parallel with the direction of gravity 5 such that the pressure sensor provides the largest measured height or minimal measured pressure.

The sensor unit 2 according to the invention can be extended with further functions and circuits to form for example, a mobile phone, a smart phone, a wrist watch, a portable fitness devices, a device that detects specific activities of a user such as a fall detection device, a device for monitoring energy expenditure by a user, a device for tracking and control, etc.

The sensor unit may comprise a housing that encloses the pressure sensor 9, the processor 10 and the wireless transmitter 14. In an embodiment the processor may be included in the pressure sensor. The sensor unit preferably further comprises at least one further sensor 8. The sensor unit 2 may for example be used as a fall detection device. The method may be used in the design process of the sensor unit 2 to determine how the pressure sensor 9 has to be oriented in the housing of the sensor unit. When the orientation of the pressure sensor relative to its housing is adjustable the method preferably is used during a manufacturing procedure or during installing of the pressure sensor 9 in the sensor unit 2. The orientation of the sensor unit is dependent on where and how the sensor unit is attached to the user 4. The method of determining the preferred orientation of the pressure sensor provides the advantage that for each of the use conditions the orientation of the pressure sensor in the sensor unit can be adjusted to the preferred orientation.

Figure 5:
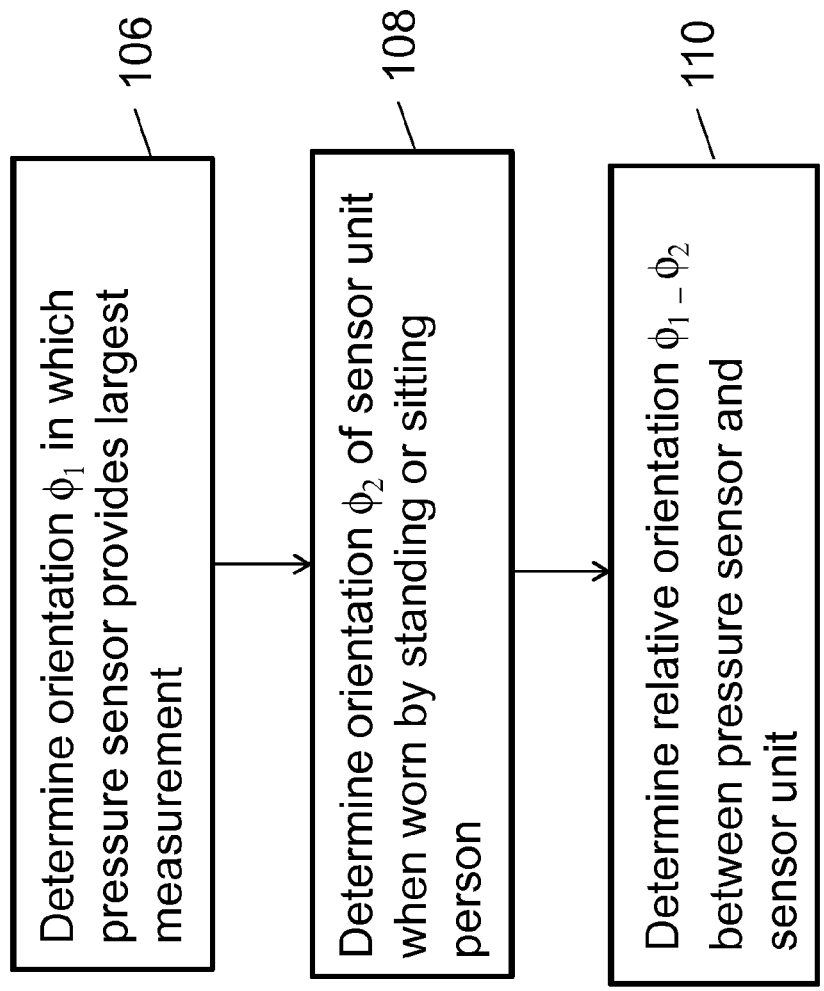
FIG. 5 shows a flow chart illustrating a method of enhancing the detectability of a height change with an air pressure sensor in accordance with the invention.

FIG. 5 shows a flow chart illustrating a method of enhancing the detectability of a height change with an air pressure sensor 4 wherein the pressure sensor is comprised in the sensor unit.

In a first step 106 of the method the preferred orientation $\phi_1$ of the pressure sensor 4 relative to the direction of gravity is determined, wherein the preferred orientation preferably is determined with the above defined method of determining the preferred orientation of the pressure sensor;

In a second step 108 a reference orientation $\phi_2$ of the sensor unit 2 is determined. The reference orientation corresponds to the orientation of the sensor unit relative to the direction of gravity when in use the sensor unit is attached to the person and the person has a predetermined posture (e.g. is standing upright or has his arms hanging downwards);

In a third step 110 a relative orientation of the pressure sensor 4 is determined. The relative orientation corresponds to the orientation of the pressure sensor 9 relative to the orientation of the sensor unit 2 wherein the pressure sensor has the preferred orientation relative to the direction of gravity while the sensor unit has the reference orientation relative to the direction of gravity.

The reference orientation $\phi_2$ corresponds to the orientation of the sensor unit 2 relative to the direction of gravity in a use condition of the sensor unit when it is attached to the body of the person 4 while the person is for example sitting in chair. The sensor unit preferably has an axis 3 wherein the relative orientation 15 of the pressure sensor corresponds to the orientation of the pressure sensor relative to said axis. Preferably the predetermined posture corresponds to the person standing upright and preferably when standing upright the axis of the sensor unit that is attached to the person is in parallel with the direction of gravity 5 (see FIGS. 6a and 6b). When the person falls and his posture changes to a lying position, the orientation of the sensor unit 2 and that of the pressure sensor 9 changes as well (see FIGS. 6c and 6d). Due to the fall there is height and orientation change of the sensor unit, both of which contribute to a change in the value of the measurement provided by the pressure sensor.

Turning to FIG. 6, in an embodiment the sensor unit 2 is used as a fall detection device. The sensor unit has the form of a pendant that is attached to the person 4 with the use of a neck cord 6. A fall of the person 4 will cause an orientation change of the pendant 2 and thus of the sensor unit.

To benefit from the contribution of the orientation change of the pressure sensor to its measurement it is preferred that the pressure sensor 9 in the fall detection device 2 has the preferred orientation when the person 4 is in a predetermined posture such as for example when standing or walking (see FIG. 6a). When for example the sensor unit comprises a printed circuit board (PCB) 11 on which a pressure sensor with a membrane is mounted and the PCB 11 is oriented in parallel with a longest axis 3 of the pendant which in use is in parallel to the direction of gravity (when attached to an upright standing person, see FIG. 6a) the pressure sensor will (in use) not have the preferred orientation as the normal to the membrane is not in parallel with the direction of gravity 5. In use the preferred orientation of the pressure sensor 9 relative to the direction of gravity 5 may not coincide with the orientation of the longest axis 3 of the pendant relative to the direction gravity 5 that is worn around the neck of the person. In FIGS. 6a-6d the pendant 2 has a rectangular shape with the neck cord 6 attached to one of the ends, but other shapes are possible and not excluded. When walking the reference orientation of longest axis 3 of the pendant shaped sensor unit is approximately in parallel with the direction of gravity 5. FIG. 6a illustrates that since the pendant 2 is attached to a necklace 6 and worn around the neck, it is most likely that in a pre-fall condition the sensor unit 2 will hang with its longest axis 3 in the vertical direction. When the person 4 has this predetermined posture (e.g. sitting, standing or walking) the sensor unit 2 has the reference orientation relative to the direction of gravity (whereby in the reference orientation there is a second angle $\phi_2$ between the longest axis and the direction of gravity) while the pressure sensor has the preferred orientation relative to the direction of gravity (whereby in the preferred orientation there is a first angle $\phi_1$ between the normal to the membrane and the direction of gravity 5). In the preferred orientation the membrane is normal to the direction of gravity 5. The relative orientation 15 defines the preferred orientation of the pressure sensor relative to the reference orientation of the sensor unit. Therefore the pressure sensor is mounted such that the membrane 17 has a relative orientation (represented by $\phi_2-\phi_1$ wherein $\phi_2$ and $\phi_1$ have been measured relative to the same axis having the direction of gravity, $\phi_2-\phi_1$ representing the angle between the longest axis of the sensor unit and the normal to the membrane of the pressure transducer that is included in the pressure sensor) relative to the sensor unit 2 to obtain the largest measurement when the pendant is in the vertical direction in which its longest axis is (substantially) in parallel with the direction of gravity. In this embodiment $\phi_1$ is about 0 degrees and $\phi_2$ is about 0 degrees resulting the relative orientation $\phi_2-\phi_1$ to become about 0 degrees. FIG. 6b shows an embodiment in which the pressure sensor 9 is mounted on a further PCB 13 that is oriented normal to the direction of the longest axis 3 and normal to the direction of gravity 5. A further embodiment in which the normal to the membrane is in parallel with the direction of gravity ($\phi_1$ is about 0 degrees) is shown in FIG. 8b which is discussed later. FIG. 6c shows the post-fall condition with the person 4 lying on the ground. FIG. 6d shows that when the user has fallen the longest axis 3 of the pendant and the normal to the membrane are perpendicular to the direction of gravity 5 (the membrane is in parallel to the direction of gravity 5), resulting in a minimal gravity induced (pressure or height) measurement error.

Figure 7B:
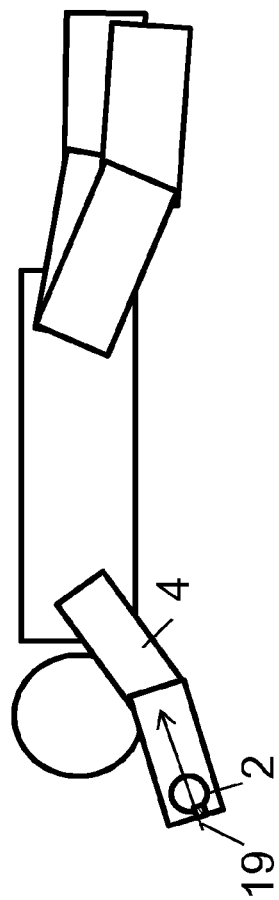
FIGS. 7*a* and 7*b* shows another user wearing a further sensor unit shaped as a wrist watch and the sensor unit before and after a fall.
Figure 7A:
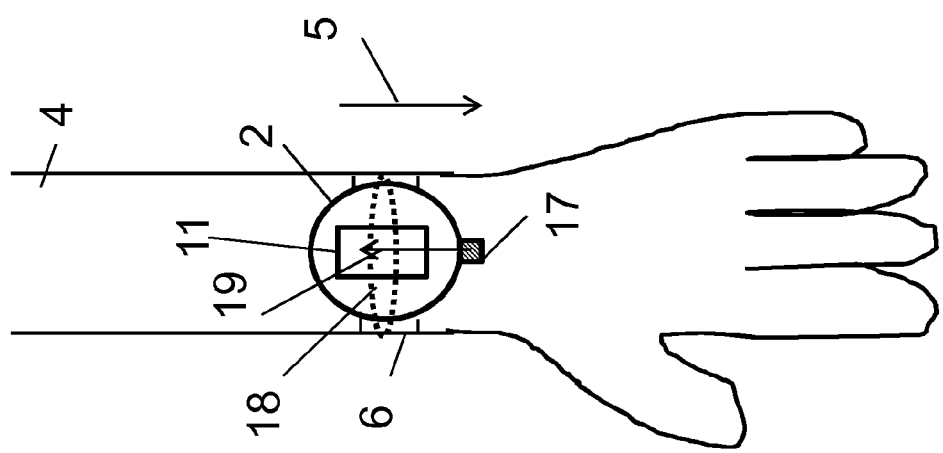

In a further embodiment shown in FIGS. 7a and 7b the sensor unit is shaped as a wrist watch 2. The wrist watch shaped sensor unit may further comprise an alarm clock unit and display means for showing time, date and for example battery status of the sensor unit. In the predetermined posture shown in FIG. 7a the left arm 4 to which the watch is attached hangs downwards, i.e. substantially parallel to the direction of gravity 5. The person may for example be standing or sitting. The reference orientation $\phi_2$ now corresponds to the orientation of the watch 2 when worn on the wrist of a downward hanging left arm. The wrist at which the sensor unit 2 is attached reaches lowest height relative to the ground when the arm 4 hangs downwards. When the person has fallen to the ground, see FIG. 7b, the height change of the wrist watch 2 is therefore relatively small (in comparison to the pendant shaped sensor unit that is carried around the neck). When the person has the predetermined posture (his left arm hanging downwards) the orientation of the pressure sensor in the sensor unit 2 is corresponding to the preferred orientation such that the direction of gravity 5 is normal to the plane in which the membrane is positioned. Therefore the pressure sensor is mounted in the watch 2 with the membrane substantially in parallel with a plane 18 that is formed by a closed strap 6. The sensor unit may comprise a PCB 11 that is oriented with its longest axis substantially in parallel with the direction of gravity 5 when the arm (to which the wrist watch is attached) is hanging downwards. In this embodiment in the reference orientation the second angle $\phi_2$ between the longest axis of the PCB 11 and the direction of gravity is about 0 degrees and in the preferred orientation the first angle $\phi_1$ between the normal to the membrane and the direction of gravity 5 is about 0 degrees. With the reference and preferred orientation expressed in angles $\phi_1$ and $\phi_2$ this results in the relative orientation (the difference between the first and second angles $\phi_1$, $\phi_2$) of about 0 degrees. In an embodiment the pressure sensor is positioned in an extension unit 17 that is coupled to the watch at the position of the winding knob, the pressure sensor having the preferred orientation when in use the arm hangs downwards.

When worn on the wrist of the right arm the reference orientation may have rotated 180 degrees (assuming the right arm is hanging downwards substantially parallel to the direction of gravity). In a further embodiment the wrist watch shaped sensor unit comprises a further pressure sensor positioned with an orientation shift of 180 degrees relative to the pressure sensor ("back to back"). The processor 10 is arranged to perform a calibration procedure to determine which of the two pressure sensors is to be used. In an embodiment the calibration procedure comprises a first step in which the wristwatch is attached to a preferred arm, a second step in which a calibration mode is activated, a third step in which the arm is hung downwards for a predetermined time such that its orientation is in parallel with the direction of gravity and a fourth step in which the pressure sensor providing the largest height measurement (or lowest pressure measurement) is selected while the other pressure sensor is switched off to reduce power consumption. This further embodiment of the wrist watch provides the advantage that it may be worn at the left or the right arm.

To enable that that the pressure sensor is fixed in the preferred orientation the sensor unit 2 preferably comprises two printed circuit boards (PCBs) 11, 13 (see FIGS. 6b and 6d). The pressure sensor is mounted on a first PCB 13 that electrically and preferably mechanically is coupled to a second PCB 11 on which other components of the sensor unit (such as for example the processor and the accelerometer) are mounted. Preferably the fall detection device 2 further comprises adjustment means for adjusting the orientation of the first PCB 13 so that the pressure sensor can be positioned in the preferred orientation. For example the position of the first PCB 13 may be adjustable relative to the second PCB 11 thereby enabling adjustment of the relative orientation 15. In another embodiment the device comprises a flexible PCB enabling the mounted pressure sensor to be positioned in the preferred orientation.

FIG. 8a shows a pressure sensor 9 comprising a housing enclosing the pressure transducer. In an embodiment the housing is an SMD package so that after mounting on a PCB 13 the membrane 17 is substantially in parallel with the PCB. In a further embodiment shown in FIG. 8b the housing provides all pins at a single side (similar as a single in line package) such that after mounting on the PCB 13 the orientation of the membrane 17 is substantially normal to the PCB 13. This is advantageous for the above discussed embodiments of the pendant and wrist watch shaped sensor units in which the relative orientation of the normal to the membrane of the pressure sensor relative to the longest axis 3 or second PCB 11 of sensor unit is about 0 degrees.

In a further embodiment the pressure sensor is mounted in a pressure chamber that is enclosed by the housing of the sensor unit. The pressure chamber further comprises a vent to the ambient air surrounding the sensor unit. The pressure chamber ensures that deformations of the sensor units housing (caused for example by gripping of the housing) do not cause changes in the air pressure that is measured by the pressure sensor. In an embodiment the orientation of the pressure sensor relative to the pressure chamber is adjustable so that the pressure sensor can be positioned in the preferred orientation. In a further embodiment the orientation of the pressure chamber relative to the housing of the sensor unit is adjustable so that the pressure sensor can be positioned in the preferred orientation.

FIGS. 5 and 6 illustrate that a fall of the person causes a height change and an orientation change of the pressure sensor. The height and orientation change result in a measured altitude drop, which value is larger than the actual height or altitude change due to the contribution of the orientation change to the measured altitude drop. In an embodiment of the sensor unit 2 the measured height change is used as a trigger for further analysis of the pressure sensor measurements and of further sensor signals (provided by the at least one further sensor). This provides the advantage that the energy consumption of the processor is reduced as the further analysis provided by the processor is dependent on the presence of a measured altitude drop exceeding a threshold.

In a further embodiment the sensor unit is used as fall detector wherein the sensor unit is arranged to determine a positive and a negative height change. A negative height change results from a fall of the person whereas a positive height change indicates that the person did standup again and therefore may not be in need for help. The sensor unit is further arranged to transmit the fall alarm signal only when the determined negative height change is not followed within a predetermined period after the determined negative height change by a determined positive height change. In a further embodiment the determined positive height change is used to revoke the fall alarm signal provided that said determined positive height change occurs within the predetermined period after the determined negative height change. The sensor unit preferably is shaped as a pendant or as a wristwatch.

In a further embodiment of a wrist worn sensor unit the mass m of the membrane of the pressure sensor is about $m=(p_1*R*A)/g$ wherein the parameters $p_1$, R, A and g are described and explained in the following text. While in the preceding text it is explained how an error in pressure reading due to gravity can be minimized for optimal height change detection, the error itself can be optimized for orientation independence in case the sensor (or sensor unit) is worn at the wrist. The optimization consists of a careful design of the effective mass of the membrane 17 the sensor 9, such in relation with an equivalent arm length of the user 4. The equivalent arm length is the typical radius along which the wrist, or, more precisely, the point where the sensor is attached, rotates when the user moves the wrist in daily motions. Example motions include reaching (e.g. getting something from a shelf), pointing, leaving the arm hanging down, holding a tray, etc. The rotation is around the shoulder and the resulting orientation independence is that the height deduced from the pressure reading is more or less equivalent to the height of the shoulder, independent of the current orientation (and height) of the wrist.

At each rotation angle θ, gravity will have another effect on the pressure reading. This can be expressed by:

$$F_{grav}=m*g*\cos(\theta) \quad \text{(equation 1)}$$

where $F_{grav}$ is the force gravity exercises on the membrane 17, m is the mass of the membrane, g is gravity (9.81 m=s2) and θ the angle of the arm with vertical. (θ=0° when pointing upward, θ=180° when hanging down.) At the same time, at each rotation the sensor 9 will be at another height. This can be expressed by $$h=h_{shoulder}+R*\cos(\theta) \quad \text{(equation 2)}$$

where h is the current height of the wrist, $h_{shoulder}$ the height of the shoulder, and R is the equivalent arm length (radius). With increasing height the air pressure decreases. For the range of height changes by arm and body movements, this dependence can be approximated in a linear form:

$$p(h)=p_0-p_1*h \quad \text{(equation 3)}$$

where p(h) is the air pressure at height h, $p_0$ is the average environmental air pressure (typically 1000 hPa), and $p_1$ is the first order dependence of pressure on height. (At different altitudes another dependence may result.) The air pressure also exercises a force on the membrane:

$$F_{press}=p(h)*A \quad \text{(equation 4)}$$

where $F_{press}$ is the force the air pressure exercises on the membrane, and A is the (equivalent) surface area of the membrane. If aimed for independence on rotation θ, i.e. the height reading is effectively indicating the height of the shoulder instead of that of the wrist, the two forces should compensate each other:

$$F_{grav}+F_{press}=m*g*\cos(\theta)+p(h)*A=F_c \quad \text{(equation 5)}$$

such that $F_c$ is dependent on $h_{shoulder}$, but independent on θ:

$$F_c=p(h_{shoulder})*A=p_0*A-p_1*h_{shoulder}*A \quad \text{(equation 6)}$$

where Eq.(3) has been used. Substitution of Eqs.(2) and (3) in Eq.(5) yields $$m*g*\cos(\theta)+p_0*A-p_1*h_{shoulder}*A-p_1*R*\cos(\theta)*A=F_c \quad \text{(equation 7)}$$

Using Eq.(6) simplifies Eq.(7) into $$m*g=p_1*R*A \quad \text{(equation 8)}$$

If the membrane has constant mass density ρ, i.e. $m=\rho*A*d$, with d the membrane thickness, the membrane surface area cancels out, and for rotation independence is arrived at $$\rho*d=(p_1/g)*R \quad \text{(equation 9)}$$

Eq.(9) provides a preferred membrane mass per surface square, so that for a wrist-worn device the pressure reading becomes independent of the orientation of the arm (provided the sensor is mounted at the preferred orientation, as explained above). The equation provides an optimum in first order.

In order to realize this independence effect the sensor needs to be mounted at the preferred orientation at which the pressure reading is the lowest (height reading is highest) when the arm is hanging down (i.e. is at the reference orientation). As described in the preceding text, this orientation is also preferred for optimal height change detectability. Next to rotating the arm around the shoulder, the arm can also rotate along the arm's direction, i.e. a torsional component (eversion/inversion). However, at the preferred orientation this torsional rotation will rotate the pressure sensor along the normal to the membrane, and, hence, the gravitational pull or push on the membrane will stay unaltered.

Membrane thickness can be controlled in the manufacturing process. This can be through the MEMS process itself, as well as through application of different coatings or coating thickness to the membrane. A coating can serve to protect the membrane from environmental effects, like wear due to humidity. The change of air pressure with height $p_1$ depends on altitude at which the sensor is worn. The equivalent arm radius R depends on the user: his body size (small/tall) as well as his typical way of gesturing (stretched or bended arms). Refinements are possible by dynamically changing the mass (per surface area), e.g. through moving mass ballast in or out of the membrane through MEMS technology.

While the invention has been illustrated and described in detail in the drawing and foregoing description, such illustration and description are to be considered illustrative or exemplary and not restrictive; the invention is not limited to the disclosed embodiments.

Variations to the disclosed embodiments can be understood and effected by those skilled in the art practicing the claimed invention, from a study of the drawings, the disclosure, and the appended claims. In the claims, the word "comprising" does not exclude other elements or steps, and the indefinite "a" or "an" does not exclude a plurality. A single processor or other unit may fulfill the function of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of enhancing the detectability of a height change with an air pressure sensor, the air pressure sensor providing a height measurement, the height measurement including a measurement error depending on the orientation of the pressure sensor relative to the direction of gravity, the air pressure sensor being included in a sensor unit, the sensor unit being attachable to a person, the method comprising the steps of
   determining a preferred orientation of the pressure sensor relative to the direction of gravity in which it provides a largest height measurement;
   determining a reference orientation of the sensor unit without the pressure sensor installed therein and relative to the direction of gravity wherein said reference orientation corresponds to the orientation of the sensor unit when attached to the person while the person has a predetermined posture;
   determining a relative orientation of the pressure sensor, the relative orientation corresponding to the orientation of the pressure sensor relative to the orientation of the sensor unit wherein the pressure sensor has the preferred orientation while the sensor unit has the reference orientation;
   mounting the pressure sensor in the relative orientation relative to the orientation of the sensor unit.

2. The method according to claim 1 wherein the sensor unit has the form of a pendant and the reference orientation corresponds to the orientation of the sensor unit when hanging around the neck of the person, the predetermined posture corresponding to the posture of a walking, standing or sitting person.

3. The method according to claim 1 wherein the sensor unit has the form of a wrist watch and the reference orientation corresponds to the orientation of the sensor unit when attached to the wrist of the person's arm, the predetermined posture corresponding to the posture of a standing or sitting person having his arms in a vertical downward position.

4. The method as claimed in claim 1 wherein sensor unit is attachable to the waist of the person and the reference orientation corresponds to the orientation of the sensor unit when attached to the waist of a person, the predetermined posture corresponding to the posture of a walking, standing or sitting person.

5. The method as claimed in claim 1 wherein the step of determining the preferred orientation comprises:
   rotating the pressure sensor in the absence of any forces other than gravity into a plurality of orientations;
   obtaining the height measurement of the pressure sensor as a function of the orientation of the pressure sensor;
   determining the orientation relative to the direction of gravity that results in the largest height measurement, the preferred orientation corresponding to said determined orientation.

6. The method as claimed in claim 5 wherein the pressure sensor comprises a membrane for detecting changes in air pressure, the pressure sensor being sensitive to gravity acting on the membrane, the preferred orientation corresponding to the orientation of the pressure sensor in which an angle between a normal to the membrane and the direction of gravity is about 0 degrees and the pressure sensor provides the largest height measurement.

7. A sensor unit for determining a height change, the sensor unit being attachable to a person and comprising a pressure sensor for providing a height measurement, the height measurement including a measurement error depending on the orientation of the pressure sensor relative to the direction of gravity, the pressure sensor having a preferred orientation and the sensor unit having a reference orientation without the pressure sensor installed therein and relative to the direction of gravity when the person has a predetermined posture, the pressure sensor being mounted in a relative orientation relative to the orientation of the sensor unit, wherein the preferred orientation of the pressure sensor is determined relative to the direction of gravity in which it provides a largest height measurement, the reference orientation of the sensor unit is determined relative to the direction of gravity wherein said reference orientation corresponds to the orientation of the sensor unit when attached to the person while the person has the predetermined posture, and the relative orientation of the pressure sensor corresponds to the orientation of the pressure sensor relative to the orientation of the sensor unit, wherein the pressure sensor has the preferred orientation while the sensor unit has the reference orientation.

8. The sensor unit for determining a height change according to claim 7 wherein the pressure sensor comprises a membrane for detecting changes in air pressure, the orientation of the pressure sensor being defined as an angle between the normal to the membrane and direction of gravity, the pressure sensor providing the largest height measurement when in use the sensor unit is attached to the person such that when the person has the predetermined posture, the sensor unit has the reference orientation and the angle is about 0 degrees.

9. The sensor unit for determining a height change as claimed in claim 8 wherein the sensor unit has the form of a pendant having a longest axis, the longest axis being about in parallel with the direction of gravity when in use the sensor unit is hanging around the neck of a sitting or standing person, the pressure sensor being mounted such that the normal to the membrane is about in parallel with the longest axis.

10. The sensor unit for determining a height change as claimed in claim 8 wherein the sensor unit has the form of a wristwatch, the wristwatch having a strap for attaching the watch to the wrist of the person, the strap when closed encircling a plane, the pressure sensor being mounted such that the normal to the membrane is about perpendicular to the plane, the normal being further in parallel with the direction of gravity when in use the sensor unit is attached to the wrist of a downward hanging arm.

11. The sensor unit for determining a height change as claimed in claim 8 wherein the sensor unit is attachable to a belt in use being worn around the waist of the person, the belt when closed encircling a plane, the pressure sensor being mounted such that the membrane is in parallel with the plane, the normal to the membrane being further in parallel with the direction of gravity when in use the sensor unit is attached to the waist of the person having a posture corresponding to a walking or standing person.

12. The sensor unit for determining a height change according to claim 7 wherein the relative orientation is about 0 degrees.

13. The sensor unit for determining a height change according to claim 7 wherein the orientation of the pressure sensor relative to the sensor unit is adjustable.

14. The sensor unit for determining a height change according to claim 7 wherein the sensor unit is further arranged to transmit an alarm signal to an emergency service provider in response to a determined negative height change.

15. The sensor unit for determining a height change according to claim 14 wherein the alarm signal is revoked if within a predetermined time period after the determined negative height change a determined positive height change is determined, or wherein the alarm signal is transmitted a predetermined time period after the determined negative height change provided that within the predetermined time period after the determined negative height change no positive height change is determined.

16. The sensor unit of claim 7, further comprising:
a first PCB, wherein the pressure sensor is disposed on the first PCB;
a second PCB electrically coupled to the first PCB; and
an adjustment device configured to adjust the pressure sensor from a first position to the relative position.

17. The sensor unit of claim 7, further comprising:
a flexible PCB configured so that the pressure sensor is mountable in the relative position, wherein the pressure sensor is mounted in the relative position.

18. The sensor unit of claim 7, further comprising:
a pressure chamber, wherein the pressure sensor is disposed in the pressure chamber.

19. The method of claim 1, further comprising:
adjusting the pressure sensor from a first position in the sensor unit to the relative position in the sensor unit.

20. The method of claim 1, further comprising:
attaching the sensor unit to an object; and
rotating the object,
wherein determining the preferred orientation of the pressure sensor further includes determining the preferred orientation of the pressure sensor with the object at a preferred orientation.

* * * * *